US005607631A

United States Patent [19]

Wolfson et al.

[11] Patent Number: 5,607,631

[45] Date of Patent: Mar. 4, 1997

[54] ENHANCED TUNABILITY FOR LOW-DIELECTRIC-CONSTANT FERROELECTRIC MATERIALS

[75] Inventors: Ronald I. Wolfson, Los Angeles; Mir A. Ali, Lomita; William W. Milroy, Playa del Rey, all of Calif.

[73] Assignee: Hughes Electronics, Los Angeles, Calif.

[21] Appl. No.: 45,333

[22] Filed: Apr. 1, 1993

[51] Int. Cl.$^6$ .............................. C04B 35/26; C04B 37/00

[52] U.S. Cl. .............................. 264/61; 264/63; 264/67; 264/177.11; 264/177.12; 264/138; 264/241

[58] Field of Search .............................. 264/61, 63, 67, 264/177.11, 177.12, 241, 138

[56] References Cited

U.S. PATENT DOCUMENTS

| | | | |
|---|---|---|---|
| 4,232,214 | 11/1980 | Shioi et al. | 219/541 |
| 4,245,146 | 1/1981 | Shioi et al. | 219/381 |
| 4,870,539 | 9/1989 | Chance | 264/61 |

OTHER PUBLICATIONS

R. J. Tonucci et al, "Nanochannel Array Glass", in *Science*, vol. 258, pp. 783–785 (30 Oct. 1992).

Electro Nucleonics, Inc., "Controlled–Pore Glass" (Product Bulletin).

Galileo Electro–Optics Corp., "Glass Capillary Arrays" (Product Bulletin).

*Primary Examiner*—James Derrington

*Attorney, Agent, or Firm*—Leonard A. Alkov; Wanda K. Denson-Low

[57] ABSTRACT

Spatial thinning in no more than two dimensions is used in order to lower both the effective dielectric constant and the dielectric loss tangent of ferroelectric ceramics, while retaining a substantial fraction of their tunability. By not thinning in the third direction, along which the dc bias field is applied, the ferroelectric material maintains the connectivity between elements of the ferroelectric structure that is essential to retaining the tunability. Examples of one-dimensional structures (30) include small diameter columns (28, 32) of dielectric material embedded in a dielectric matrix (26, 34). Examples of two-dimensional structures (21) include square (22) and hexagonal (24) cells comprised of ferroelectric material filled with inert dielectric material or vice versa.

9 Claims, 5 Drawing Sheets

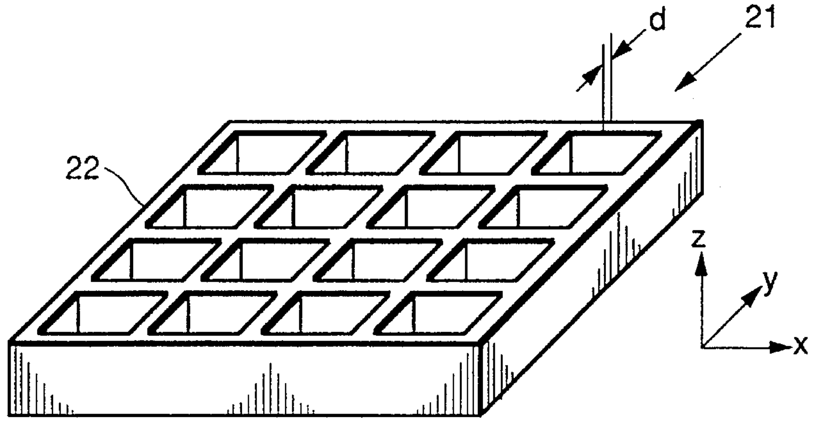
FIG. 10a.
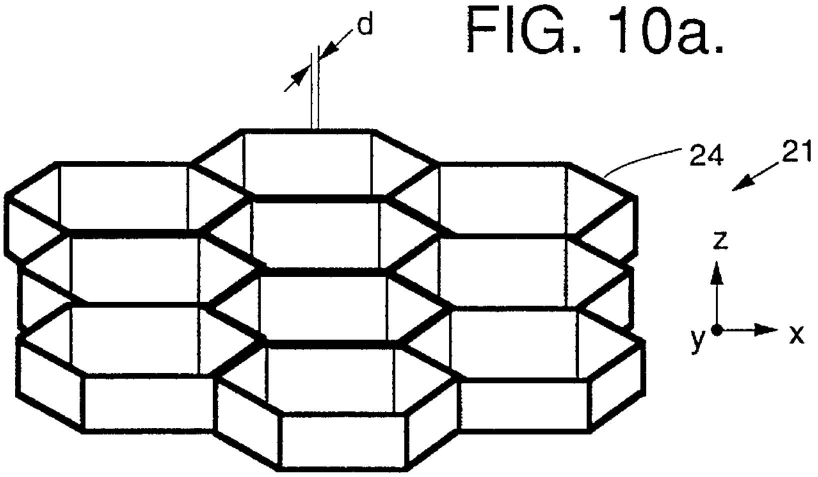
FIG. 10b.
FIG. 11.
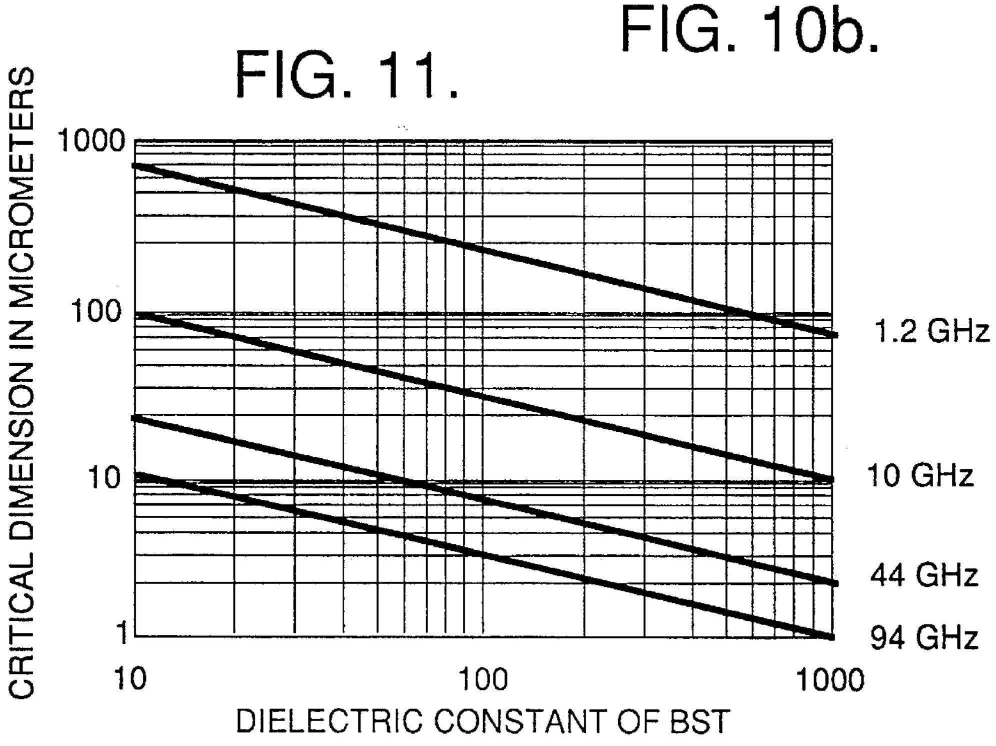

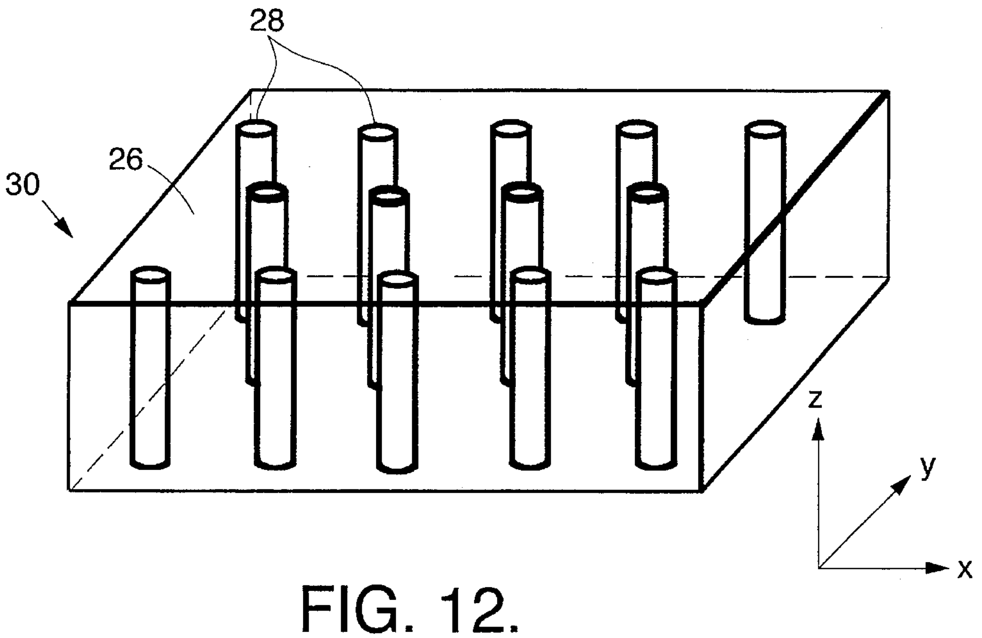
FIG. 12.
FIG. 13.
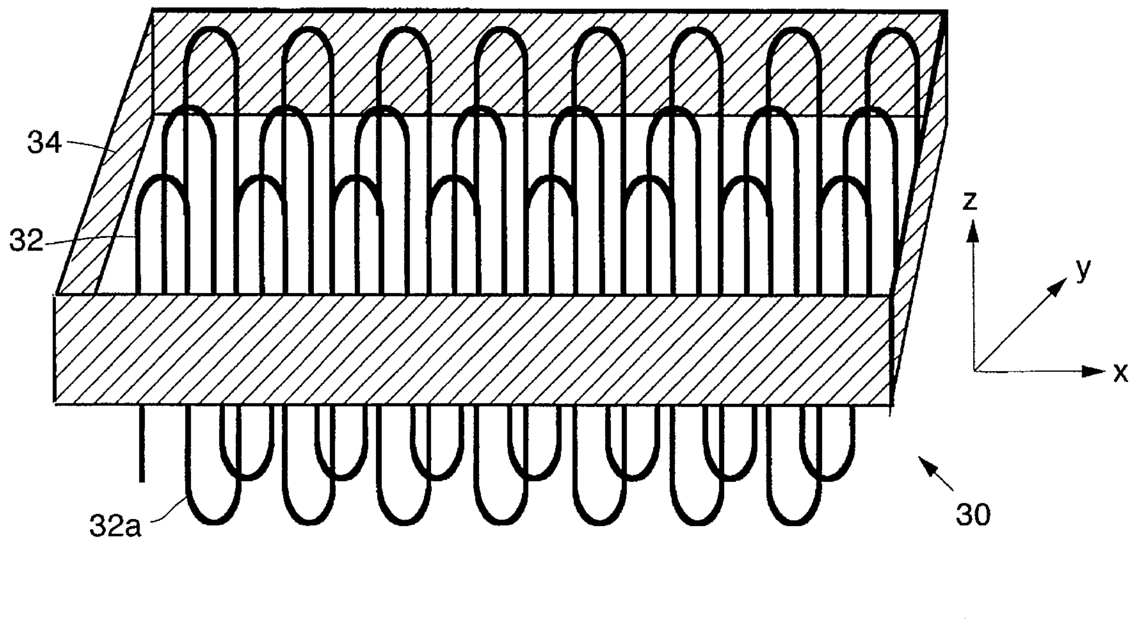

ENHANCED TUNABILITY FOR LOW-DIELECTRIC-CONSTANT FERROELECTRIC MATERIALS

BACKGROUND OF THE INVENTION

1. Field of the Invention

The present invention relates generally to ferroelectric materials, and, more particularly, to a method of reducing the dielectric constant of such materials while preserving much of their inherent tunability.

2. Description of Related Art

Four of the most important characteristics of a ferroelectric ceramic that are desired for practical microwave phase shift devices or electronically scanned array (ESA) antennas are (1) low ($\epsilon_r \leqq 100$) dielectric constant, (2) low ($\leqq 0.010$) loss tangent tan δ, (3) substantial ($\geqq 10\%$) tunability, and (4) stability of material properties over the operating temperature range. The material selected for a given application will, in general, be a trade-off, as not all of the properties wanted can be realized simultaneously. For example, by operating high-density barium-strontium-titanate (BST) close to its Curie temperature, a dielectric constant that exceeds 5,000 with 80 percent tunability is achievable; however, both parameters decline rapidly as the operating temperature is varied just a few degrees in either direction.

The three most important reasons for seeking materials with dielectric constants less than 100 are:

(1) Circuit dimensions and tolerances scale inversely as the square-root of dielectric constant.

This adversely impacts producibility of ferroelectric microwave devices by conventional machining techniques, especially with $\epsilon_r > 100$.

(2) RF losses per unit length are directly proportional to both the dielectric loss tangent and the square-root of the dielectric constant. Typically, when the dielectric constant of a material such as BST is lowered, its loss tangent is also reduced.

(3) Ferroelectric ceramics with a low dielectric constant generally have material properties that exhibit better temperature stability.

Prior art approaches for lowering the dielectric constant employ three-dimensional thinning techniques, such as by inducing porosity in the ferroelectric material or by mixing the ferroelectric material with inert, low dielectric-constant fillers. However, as porosity or percent volume of filler increases, the polycrystalline structure of the ferroelectric ceramic becomes more and more "disconnected". By "disconnected" is meant that the ferroelectric structure is no longer continuous, with the result that the applied dc electric field moves more into the pores or filler, which effectively reduces the tunability of the composite. The applied dc electric field can be raised to compensate for this effect; however, dielectric breakdown (i.e., arcing) eventually occurs within the material before full tunability of the material can be exploited. This occurs because most of the applied dc electric field becomes impressed across the material with the lower $\epsilon_r$: i.e., across the air gaps or filler rather than the ferroelectric material.

Thus, there remains a need for providing a method of reducing the dielectric constant of ferroelectric materials while retaining much of their inherent tunability.

SUMMARY OF THE INVENTION

In accordance with the invention, a method is provided for lowering the dielectric constant of ferroelectric materials while preserving much of their inherent tunability. The present invention provides several means for lowering the dielectric constant and loss tangent by spatial thinning of the active material in one or two dimensions only, while leaving intact the remaining direction along which the dc bias field can be applied with maximum effect. Thus, ferroelectric ceramics so treated suffer only a minimal loss of tunability.

In particular, the method of the invention alters properties in a ferroelectric material having a dielectric constant $\epsilon_r$, a loss tangent tan δ, and tunability at a given frequency f. This is accomplished by using no more than two spatial dimensions for effectively lowering the dielectric constant, which allows the polycrystalline structure of the ferroelectric ceramic to remain connected along the third spatial dimension, where application of the dc bias field will have maximum effect on tunability.

A critical dimension d of the structured geometry exists in a direction orthogonal to the dc bias field and parallel to the direction of propagation of the radio frequency (RF) field, and is given by the approximate equation $$d \leqq \frac{c}{100 f \sqrt{\epsilon_r}}$$

where c is the velocity of light, taken equal to 299, 793 kilometers/second.

For structures with features that are smaller than d, the dielectric material appears to be homogeneous on a macroscopic scale and attenuation of the RF signal due to internal scattering is negligible. However, as the scale of the structure becomes larger with respect to d, internal scattering will gradually increase until the RF losses predominate. Analytic modeling of several structured dielectrics shows that features which are less than 0.01 wavelength in the material produce negligible internal reflections; hence, the factor 100 was selected for the equation above.

BRIEF DESCRIPTION OF THE DRAWINGS

FIGS. 10*a–b* are perspective views of honeycomb structures for lowering the dielectric constant of ferroelectric materials in accordance with the invention, with FIG. 10*a* depicting a square cell structure and with FIG. 10*b* depicting a hexagonal cell structure;

FIG. 11, on coordinates of critical dimension (in micrometers) and dielectric constant of BST, is a plot of the critical dimension of ferroelectric ! structures versus dielectric constant at 1.2, 10, 44, and 94 GHz;

FIG. 12 is a perspective view of a dielectric plate with ferroelectric material embedded in an array of through holes; and FIG. 13 is a perspective view of a process for aligning continuous ferroelectric fibers in an array pattern for embedment in an inert dielectric matrix.

DESCRIPTION OF THE PREFERRED EMBODIMENTS

The usefulness of ferroelectric ceramics for microwave applications is fundamentally limited by two characteristics of the material: the degree of tunability that is achievable (i.e., change in relative dielectric constant with an applied dc electric field) and the RF dielectric losses. A ratio of these parameters defines a "figure of merit", usually expressed as "degrees of phase shift per dB of loss" for a phase shift device or "degrees of scan coverage per dB of loss" for an electronically scanned array (ESA) antenna.

Figure 1A:
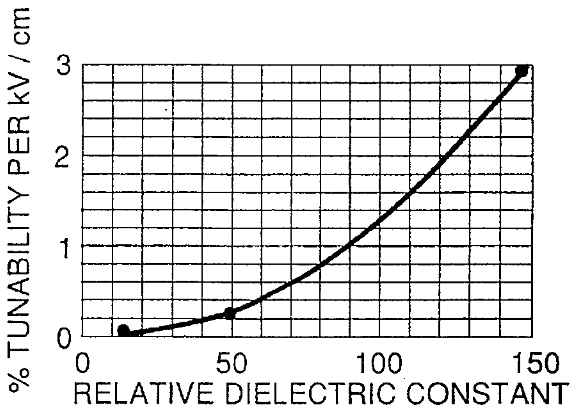
FIG. 1a. ( PRIOR ART )
FIG. 1*a* is a plot on coordinates of percent tunability per kV/cm and relative dielectric constant for samples of porous barium-strontium-titanate ceramics.
Figure 1B:
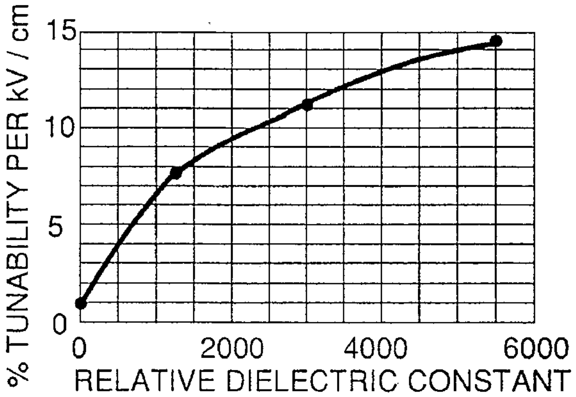
FIG. 1b. ( PRIOR ART )
FIG. 1*b* is a plot similar to FIG. 1*a*, but for samples of composite barium-strontium-titanate ceramics.

Two prior art approaches, discussed above, have been used to reduce the effective dielectric constant of ferroelectric electric ceramics such as barium-strontium-titanate (BST): increasing the porosity and mixing with an inert, low-di-electric-constant filler. Both of these methods may be considered to constitute a three-dimensional thinning approach. FIG. 1 compares percent tunability per kV/cm for three samples of porous BST ($15 \leqq \epsilon_r \leqq 150$) (FIG. 1*a*) and for four composites of BST ($60 \leqq \epsilon_r \leqq 5510$) made by sintering with various percentages of alumina (FIG. 1*b*). Both Figures demonstrate that the dielectric constant may be reduced by the prior art teachings, but only with a significant loss of tunability.

Figure 2:
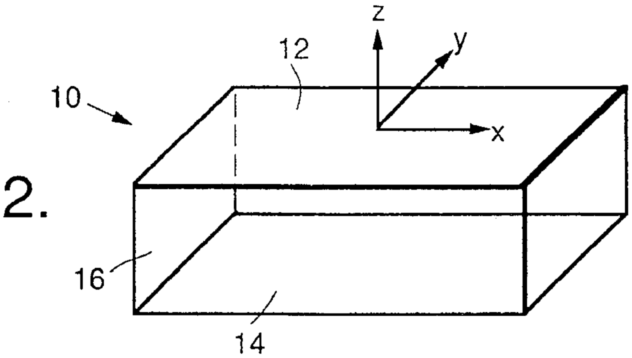
FIG. 2 is a perspective view of a dielectric-filled, parallel-plate region and associated rectangular coordinate system.

The present invention reduces both $\epsilon_r$ and loss tangent of a ferroelectric material and yet retains much of its inherent tunability in the following manner. Consider a dielectric filled, parallel-plate structure 10 such as that shown in FIG. 2. The parallel-plate structure 10 comprises top and bottom parallel conductive plates 12, 14, respectively, separated by a ferroelectric material 16. An electromagnetic wave (not shown), which is bounded by the parallel-plate region, propagates in the y-direction with its E-field parallel to the z-axis. Traditional methods for reducing $\epsilon_r$ of the ferroelectric material in the parallel-plate region consist of lowering the concentration of the active material (e.g., BST) in three dimensions, as in the previously cited examples of porous or homogeneous composite ceramics. The undesirable side effect of this dilution process is that the polycrystalline structure of BST becomes disconnected, particularly in the z-direction, the axis along which the dc bias field is applied. To avoid this problem, ferroelectric ceramics need to be configured such that both high density and connectivity are retained in the z-direction, while $\epsilon_r$ is reduced by thinning the ferroelectric material in the x- and y-directions only.

Figure 3A:
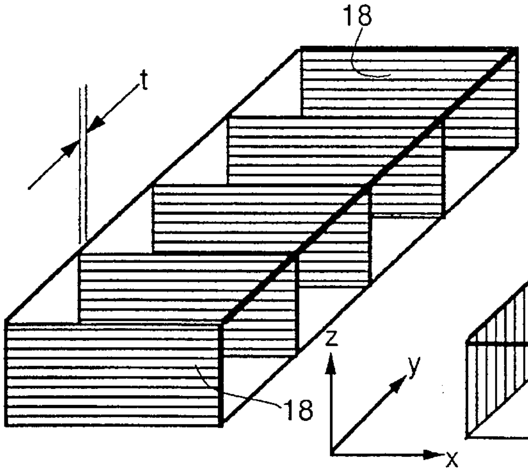
FIGS. 3*a–b* are perspective views of slabs continuous in two dimensions in which the remaining dimension is used to reduce the dielectric constant of the ferroelectric material in accordance with the invention, with FIG. 3*a* depicting slabs normal to the direction of propagation of the RF field and with FIG. 3*b* depicting slabs parallel to the direction of propagation.
Figure 3B:
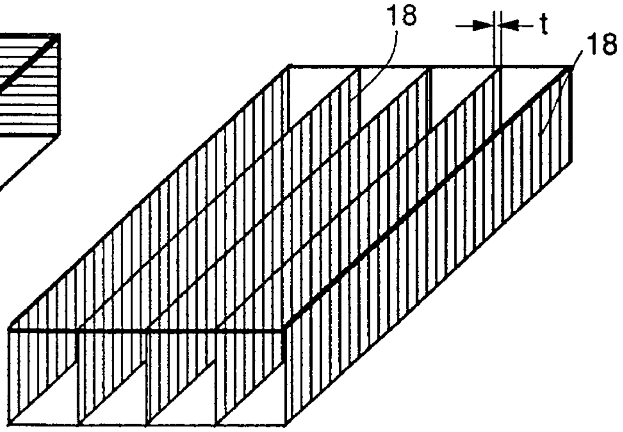

FIG. 3 shows one such geometry that accomplishes this objective: thin sheets, or slabs, 18 of ferroelectric material, having a thickness t, that are continuous in both the z-direction and one other axis, while the remaining direction is used to reduce the effective $\epsilon_r$ of the dielectric. FIG. 3*a* depicts ferroelectric slabs 18 that are continuous parallel to the z-x plane, while FIG. 3*b* depicts ferroelectric slabs that are continuous parallel to the z-y plane.

Fewer reflections and higher-order modes are generated if the dielectric slabs 18 are oriented normal to the direction of propagation (FIG. 3*a*), rather than longitudinally (FIG. 3*b*). For the example illustrated in FIG. 3*a*, if the slab thickness is small (approximately 0.01 of a guide wavelength or less in the dielectric), then interference with the RF fields will be negligible.

SHUNT CAPACITOR MODEL

Figure 4:
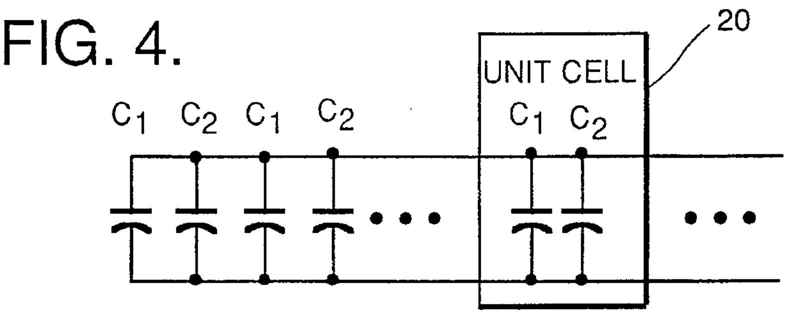
FIG. 4 is a schematic diagram of a shunt capacitor model of dielectric slabs in the parallel-plate structure.

The parallel-plate slabs 18 of FIG. 3 can be represented by the shunt capacitor model shown in FIG. 4. Let $C_1$ be the parallel-plate capacitance of the ferroelectric slab, F be the fractional fill factor by volume of ferroelectric material that occupies each unit cell 20, and $C_2$ be the capacitance of the low-dielectric spacer. $C_1$, $C_2$, and $C_T$ can then be written:

$$C_1 = K\epsilon_{r_1}\left(\frac{A_1}{h}\right) \tag{1}$$

$$C_2 = K\epsilon_{r_2}\left(\frac{A_2}{h}\right) \tag{2}$$

$$C_T = C_1 + C_2 = \frac{KA_T}{h}\,[F\epsilon_{r_1} + (1-F)\epsilon_{r_2}] \tag{3}$$

where:

K=a constant of proportionality;

$\epsilon_{r_1}$=dielectric constant of the dielectric slab;

$\epsilon_{r_2}$=dielectric constant of the spacer;

$A_1$ and $A_2$=the areas projected by the slabs within each unit cell onto the parallel-plates;

$A_T=A_1+A_2$; and h=the distance between the parallel plates.

The quantity in brackets (in Equation 3) represents the effective ("eff") dielectric constant of the composite material in the unit cell:

$$\epsilon_{r_{eff}}=F\epsilon_{r_1}+(1-F)\epsilon_{r_2} \tag{4}$$

The effective loss tangent and the dielectric losses of the composite material can be expressed as:

$$\text{TAN }\delta_{eff}=F\text{ TAN }\delta_1+(1-F)\text{ TAN }\delta_2 \tag{5}$$

$$\text{LOSS(dB/inch)} = \frac{8.68\pi}{\lambda_0\text{(inch)}}\sqrt{\epsilon_{r_{eff}}}\ \text{TAN }\delta_{eff} \tag{6}$$

The fractional tunability, T, of the ferroelectric material is defined as the change in relative dielectric constant from zero bias to the maximum applied dc bias, divided by the zero bias value. The shunt capacitor model can be used to derive the following expression for the effective fractional tunability of a composite material:

$$T_{eff} = 1 - \frac{[(1-T)F\epsilon_{r_1} + (1-F)\epsilon_{r_2}]}{[F\epsilon_{r_1} + (1-F)\epsilon_{r_2}]} \quad (7)$$

Another parameter of interest is introduced in Equation (8): the "scan figure of merit." This defines the scan coverage that can be obtained from certain radiating structures as the dielectric constant of the internal propagating medium is varied. When the scan figure of merit equals the value 2, then the radiated beam can be scanned from −90° to +90°, which defines the limit of real space Values greater than 2 cannot yield any further scan coverage, but will produce additional scan bands. It will be noted that as the value of dielectric constant increases, the fractional tunability required to achieve a desired scan coverage becomes smaller. The RF dielectric loss in dB per unit length, however, increases both with loss tangent and the square-root of the dielectric constant. Thus, for any given application, the optimal value of dielectric constant is a trade-off between the achievable tunability and the dielectric losses of the material available.

$$\text{SCAN FIGURE OF MERIT} = |(\text{SIN } \theta_1 - \text{SIN } \theta_2| \quad (8)$$

$$= \sqrt{\epsilon_{r_1}} - \sqrt{\epsilon_{r_2}}$$

Figure 5:
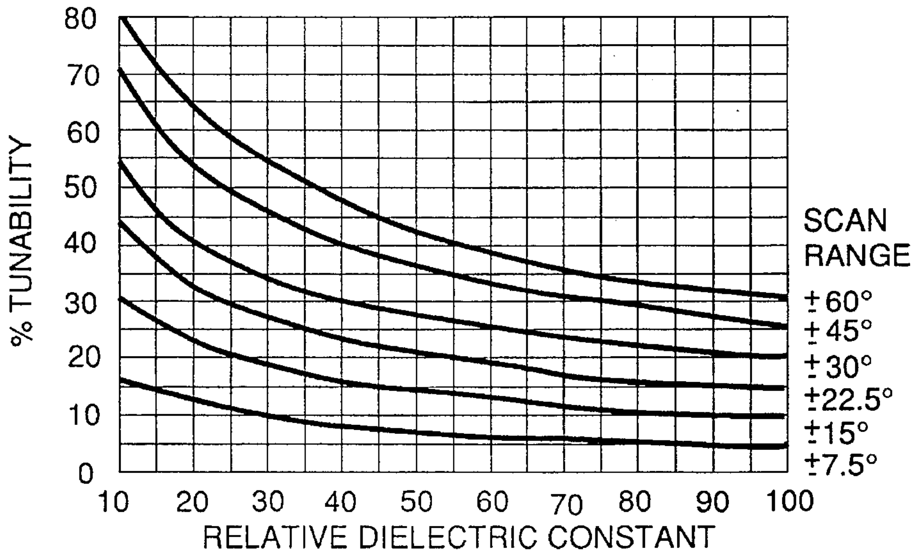
FIG. 5, on coordinates of tunability in percent and relative dielectric constant, is a plot of tunability required as a function of $\epsilon_r$ to achieve scan coverage from a parallel-plate radiating structure that ranges from ±7.5° to ±60°.

Equation (8) can be modified to determine the fractional tunability that is required, as a function of the dielectric constant of a material, in order to achieve various degrees of scan coverage. The results of scan-coverage ranges between ±7.5° and ±60° are shown in FIG. 5 for values of dielectric constant between 10 and 100. The graph is useful for selecting appropriate materials for specific applications. For example, in order to scan ±45° with a zero-bias dielectric constant of 15, a material with about 60% tunability is required. This degree of tunability is unrealistic for low dielectric constant materials. A much better choice of materials, provided that the losses are acceptable, would be a dielectric constant of 60, which requires a tunability of only 33% for ±45° scan.

PREDICTED PERFORMANCE OF COMPOSITE DIELECTRICS

A viable approach for producing ferroelectric materials with reduced dielectric constants that range, e.g., from 10 to 100, is to combine both porosity and geometric thinning techniques. Predicted characteristics for a family of composite ferroelectric slabs with reduced $\epsilon_r$ have been computed from Equations (4) through (8). The materials used for this example consist of porous BST with the properties listed in Table I and polystyrene spacers which have a dielectric constant of 2.55 and loss tangent of 0.0012 measured at 10.0 GHz. This particular sample of BST was selected because its dielectric constant has been successfully reduced through porosity from several thousand to 150, yet 30 percent tunability has been retained.

TABLE I

Properties of Porous BST Measured at 1.0 GHz.

| | |
|---|---|
| Theoretical Density | 35% |
| Relative Dielectric Constant | 150 |
| Loss Tangent | 0.010 |
| Fractional Tunability | 0.30 |
| DC Bias Field | 10.0 kV/cm |

The computed results are listed in Table II for composite dielectrics with fill factors of BST that vary from zero up to 40 percent.

TABLE II

Computed Data for Reduced $\epsilon_r$ Dielectric.

| % F | $\epsilon_{r\,eff}$ | TAN $\delta_{eff}$ | % $T_{eff}$ | SFM | LOSS (dB/in) |
|---|---|---|---|---|---|
| 0.0 | 2.55 | 0.00120 | 0.00 | 0.000 | 0.044 |
| 1.0 | 4.02 | 0.00129 | 11.18 | 0.115 | 0.060 |
| 2.0 | 5.50 | 0.00138 | 16.37 | 0.205 | 0.075 |
| 3.0 | 6.97 | 0.00146 | 19.36 | 0.269 | 0.089 |
| 4.0 | 8.45 | 0.00155 | 21.71 | 0.328 | 0.104 |
| 5.0 | 9.92 | 0.00164 | 22.68 | 0.380 | 0.119 |
| 6.0 | 11.40 | 0.00173 | 23.69 | 0.427 | 0.135 |
| 7.0 | 12.87 | 0.00182 | 24.47 | 0.470 | 0.151 |
| 8.0 | 14.35 | 0.00190 | 25.09 | 0.510 | 0.167 |
| 9.0 | 15.82 | 0.00199 | 25.60 | 0.547 | 0.183 |
| 10.0 | 17.30 | 0.00208 | 26.06 | 0.582 | 0.200 |
| 11.0 | 18.77 | 0.00217 | 26.37 | 0.615 | 0.217 |
| 12.0 | 20.24 | 0.00226 | 26.68 | 0.647 | 0.235 |
| 13.0 | 21.72 | 0.00234 | 26.94 | 0.677 | 0.252 |
| 14.0 | 23.19 | 0.00243 | 27.16 | 0.706 | 0.271 |
| 15.0 | 24.67 | 0.00252 | 27.36 | 0.734 | 0.289 |
| 16.0 | 26.14 | 0.00261 | 27.54 | 0.761 | 0.308 |
| 17.0 | 27.62 | 0.00270 | 27.70 | 0.787 | 0.327 |
| 18.0 | 29.09 | 0.00278 | 27.84 | 0.812 | 0.347 |
| 19.0 | 30.57 | 0.00287 | 27.97 | 0.837 | 0.367 |
| 20.0 | 32.04 | 0.00296 | 28.09 | 0.860 | 0.387 |
| 21.0 | 33.51 | 0.00305 | 28.20 | 0.884 | 0.408 |
| 22.0 | 34.99 | 0.00314 | 28.30 | 0.906 | 0.429 |
| 23.0 | 36.46 | 0.00322 | 28.39 | 0.926 | 0.450 |
| 24.0 | 37.94 | 0.00331 | 28.47 | 0.950 | 0.471 |
| 25.0 | 39.41 | 0.00340 | 28.54 | 0.971 | 0.493 |
| 26.0 | 40.89 | 0.00349 | 28.62 | 0.992 | 0.515 |
| 27.0 | 42.36 | 0.00358 | 28.68 | 1.012 | 0.538 |
| 28.0 | 43.84 | 0.00366 | 28.74 | 1.032 | 0.560 |
| 29.0 | 45.31 | 0.00375 | 28.80 | 1.051 | 0.584 |
| 30.0 | 46.79 | 0.00384 | 28.86 | 1.071 | 0.609 |
| 31.0 | 48.26 | 0.00393 | 28.91 | 1.089 | 0.630 |
| 32.0 | 49.73 | 0.00402 | 28.95 | 1.108 | 0.654 |
| 33.0 | 51.21 | 0.00410 | 29.00 | 1.126 | 0.679 |
| 34.0 | 52.68 | 0.00419 | 29.04 | 1.144 | 0.703 |
| 35.0 | 54.16 | 0.00428 | 29.08 | 1.162 | 0.728 |
| 36.0 | 55.63 | 0.00437 | 29.12 | 1.179 | 0.753 |
| 37.0 | 57.11 | 0.00446 | 29.16 | 1.196 | 0.778 |
| 38.0 | 58.58 | 0.00454 | 29.19 | 1.213 | 0.804 |
| 39.0 | 60.06 | 0.00463 | 29.22 | 1.230 | 0.829 |
| 40.0 | 61.53 | 0.00472 | 29.25 | 1.246 | 0.855 |

The last column of Table II gives the calculated dielectric loss in dB per inch at 10.0 GHz. To obtain the loss per inch at other frequencies, the values given can be scaled directly with frequency.

Figure 6:
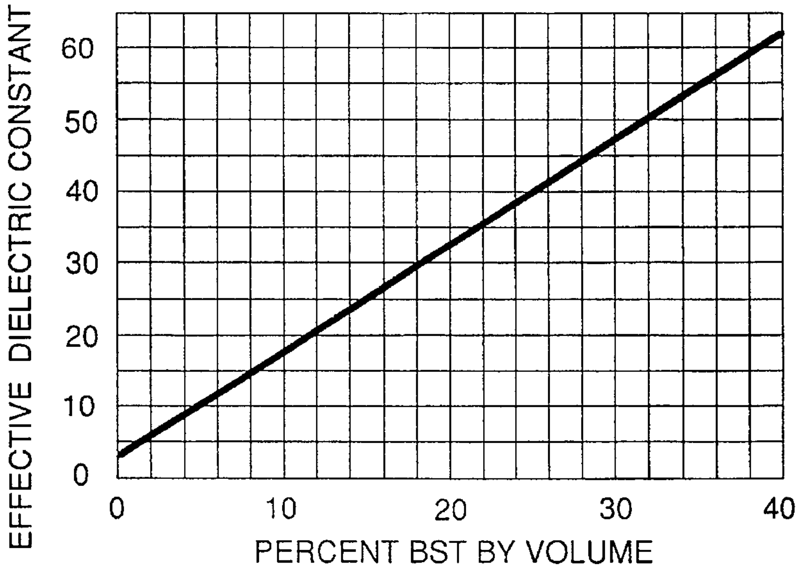
FIG. 6, on coordinates of effective dielectric constant and percent BST by volume, is a plot of the effective $\epsilon_r$ versus percent fill factor by volume of BST in a BST/polystyrene composite dielectric.

It can be seen from Equation (4) that the effective dielectric of the composite material which is derived from the shunt capacitor model is a simple linear function of the fill factor. FIG. 6 is a graph of this relationship for the example composite dielectric.

Figure 7:
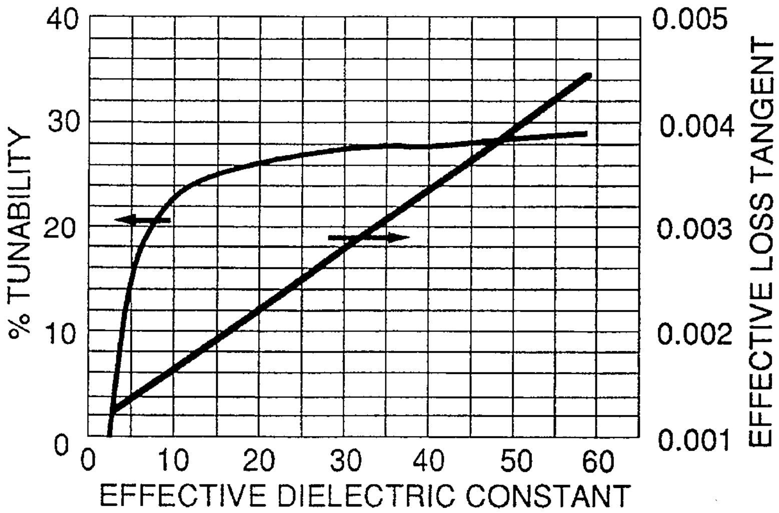
FIG. 7, on coordinates of percent tunability (left hand side of graph) and effective loss tangent (right hand side of graph) and effective dielectric constant, are plots of effective loss tangent and tunability versus effective $\epsilon_r$ of BST/polystyrene composite dielectrics.

FIG. 7 shows the percent tunability and the effective loss tangent for the example composite materials made from BST and polystyrene slabs versus the effective dielectric constant, which is determined by percent fill factor of BST by volume. It will be noted that for the example composite dielectrics formulated from porous BST with properties listed in Table I, the tunability curve flattens out rapidly for dielectric constant greater than 15, while loss tangent continues to increase linearly.

Figure 8:
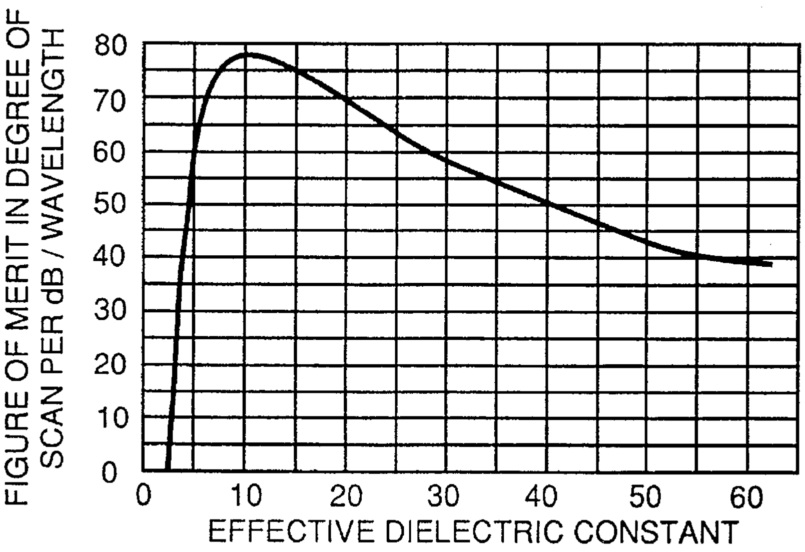
FIG. 8, on coordinates of figure of merit in degrees of scan per dB/wavelength and effective dielectric constant, is a plot the figure of merit for BST/polystyrene composite dielectrics.

FIG. 8 introduces another figure of merit for the material, derived from dividing the obtainable scan coverage by dielectric loss, in dB per wavelength, for each value of dielectric constant. The optimal figure of merit for this family of materials occurs for dielectric constants of about 5 to 25. FIG. 8, however, should not be misconstrued to imply that a given material with dielectric constant 10 will permit scan coverage of ±78°: on the contrary, the curves of FIG. 5 show that the scan coverage of that material with $\epsilon_r$=10 and 30% tunability is ±15°.

Figure 9:
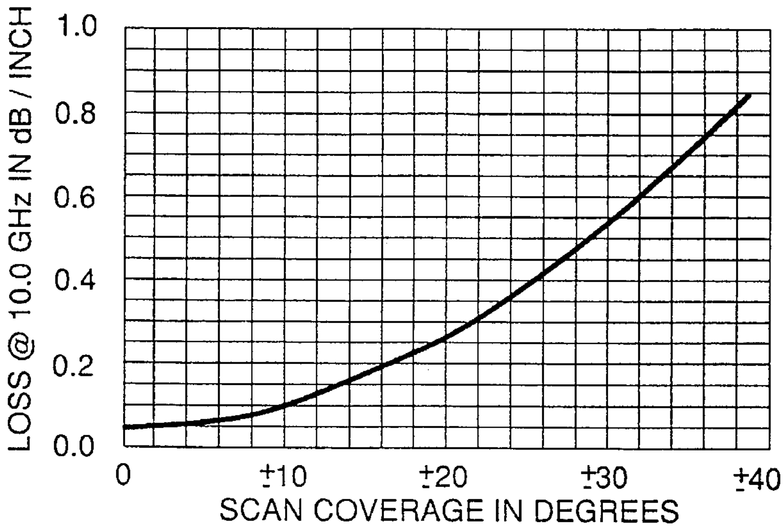
FIG. 9, on coordinates of loss at 10.0 GHz (in dB/inch) and scan coverage (in degrees), is a plot of dielectric loss at 10.0 GHz versus scan coverage.

FIG. 9 uses the data from Table II to illustrate the trade-off between scan coverage in degrees and dielectric loss in dB/inch at 10.0 GHz. Although these graphs are specific to the example materials derived from the BST of Table I, the performance is typical of composite dielectrics that are achievable using existing materials.

GEOMETRIC REDUCTION OF DIELECTRIC CONSTANT

FIG. 3 was used to illustrate how alternate slabs of ferroelectric material and low-dielectric spacers can reduce the overall dielectric constant and loss tangent of a composite dielectric and yet retain much of its inherent tunability. While the geometry proposed is simple, it utilizes only one of the two dimensions that are available for reducing dielectric constant without compromising connectivity in the z-direction that is needed for high tunability at reasonable dc bias levels. Concepts for two-dimensional thinning are discussed below. These approaches have some attractive features when compared to the slab configuration:

(a) Materials covering the desired values of dielectric constant below 100 are realizable with attractive loss and tunability characteristics.

(b) The increased homogeneity that can be achieved is less likely to cause reflections and higher-order modes from the propagating RF fields.

(c) The geometries may offer weight and structural advantages.

The honeycomb structures 21 shown in FIGS. 10*a–b*, which are comprised of either square cells 22 (FIG. 10*a*) or hexagonal cells 24 (FIG. 10*b*), can be extruded from a slurry made of ferroelectric powders that have been prepared by calcination, grinding and the addition of binders. The thickness of the walls of the honeycomb structures 21 is dictated by the critical dimension, calculated according to Equation (9) below. Alternately, the honeycomb structure 21 can be made from a low-dielectric ceramic such as alumina, which is then co-fired with a ferroelectric material deposited within the cells 22 or 24. In this case, the thickness of the walls is increased so that the dimension of the cells 22 or 24 is dictated by the critical dimension.

Only square and hexagonal cells have been alluded to above; however, the invention is not considered to be limited to those shapes. Other general cell shapes, such as rectilinear and curvilinear, may also be employed in the practice of the invention.

The state-of-the-art for extruding ceramic honeycomb structures is about 1.000 cells per square inch, with walls down to 0.010 inch thick. A sample of hexagonal honeycomb, of which the main ingredient was high-purity barium titanate, was obtained for evaluation from TDK Electronics Company. The hex-cell openings were 0.038 inch across the flats, with wall thickness of 0.012 inch. For evaluation, the cells were filled with a castable polyester and electrodes were formed using silver paint. The material, tested at 1.0 MHz, exhibited a zero-bias dielectric constant of 135, loss tangent of 0.016, and tunability of 3.4% at 13.2 kV/cm bias field. While the small tunability obtained is not impressive, it should be noted that this particular material was developed for use as a heating element, not for microwave applications.

The size of cell structure that can be tolerated before adverse interactions occur with the propagating RF field can be approximated. This assessment should be done rigorously using an accurate model of the dielectric geometry in a parallel-plate structure; however, the simple analysis presented is representative of the magnitudes involved. The critical dimension is determined by the size and dielectric constant of the ferroelectric obstacle in the direction of propagation of the RF waves. For the examples cited later, slab thickness, cell wall thickness or post diameter are the discriminating feature. The criterion selected for critical dimension d is given by Equation (9):

$$d \leq \frac{\lambda_0}{100\sqrt{\epsilon_r}} = \frac{c}{100f\sqrt{\epsilon_r}} \qquad (9)$$

The critical dimension d is given in micrometers when the velocity of light, c, is taken equal to 299,793 kilometers/second and f is in GHz. FIG. 11 is a graph of critical dimensions in micrometers as a function of dielectric constant of the ferroelectric material for four representative microwave frequencies: 1.2, 10, 44, and 94 GHz. It will be noted that for $\epsilon_r=25$, the critical dimension is only 0.5 millimeter (500 micrometers) at 1.2 GHz. This dictates a honeycomb cell size approximately two millimeters across. The chances of this geometry operating effectively above 5.0 GHz does not look promising and the millimeter-wave region is certainly out of the question. However, by inverting the honeycomb, i.e., making thick walls out of an inert dielectric and filling the small holes remaining in the center with ferroelectric material, then the operating frequencies can be extended upward an octave or two.

Such a geometry suggests a more producible design, shown in FIG. 12. Here, a simple dielectric sheet or plate 26 is perforated with a uniform array of through holes 28, which are then permeated with suitable ferroelectric material to form a composite 30. An attractive approach for filling the small holes 28 is vacuum impregnation, which can be implemented using either a slurry of ferroelectric powders or materials from the solution-gelation (sol-gel) process. The holes 28 may also be filled by means of either vapor or plasma deposition of the ferroelectric material, provided that the dielectric plate 26 is capable of withstanding the temperatures involved in the deposition process. There is a multitude of vendors that fabricate microporous materials for such applications as filtering, screening, wicking, and diffusing. Typical hole diameters range from 0.1 to 500 micrometers, with void volumes from zero up to 50 percent. The graph shown in FIG. 11 suggests that hole diameters between one and ten micrometers should be acceptable for operation at 94 GHz.

Small-diameter columns can be formed by drawing the ferroelectric material into long, continuous filaments which are the aligned in an array and embedded within a matrix of inert dielectric material. Typical diameters for fibers are in the range of 100 to 1,000 micrometers. Processes for arraying and embedding such fibers have already been developed for fabricating z-axis polymeric interconnects. FIG. 13 illustrates a composite 30 fabricated by a weaving process that might be used to align the fibers 32, either in uniform or graded array patterns, for embedment into the inert dielectric matrix 34. The fiber loops 32*a* extending beyond the polymer surfaces after embedment can be removed.

In the Figures, Z is the direction of both the applied dc bias field and the polarization (i.e., the direction of the RF electric field), while Y is the direction of propagation of the RF field.

Thus, there has been disclosed a method of reducing the dielectric constant of ferroelectric materials while retaining much of their tunability. It will be readily apparent to those skilled in this art that various changes and modifications of an obvious nature may be made, and all such changes and modifications are considered to fall within the scope of the invention, as defined by the appended claims.

What is claimed is:

1. A method of of altering properties in a ferroelectric material having a dielectric constant $\epsilon_r$, a loss tangent tan δ, and a tunability at a given frequency f, comprising reducing said dielectric constant and said loss tangent while preserving a substantial fraction of said tunability by providing structures of said ferroelectric material, said structures oriented such that at least one dimension of said structures is parallel to a direction of applied dc bias field, said structures also having a critical dimension d in a direction orthogonal to said direction of applied dc bias field and parallel to the direction of propagation of an RF field at a frequency f that is given by the equation $$d \leqq \frac{c}{100f\sqrt{\epsilon_r}}$$

where c is the velocity of light, taken equal to 299,793 kilometers/second;

wherein said method comprises embedding a plurality of columns of ferroelectric material in a matrix of an inert dielectric material, said columns having a cross-sectional dimension equal to or less than said critical maximum dimension.

2. The method of claim 1 wherein said structures are formed by (a) providing continuous filaments of ferroelectric material;

(b) embedding said continuous filaments in a body comprising said inert dielectric material in an array pattern, leaving loops of filaments extending beyond said body of inert material; and (c) removing said loops to leave said plurality of columns.

3. A method of altering properties in a ferroelectric material having a dielectric constant $\epsilon_r$, loss tangent tan δ, and a tunability at a given frequency f, comprising reducing said dielectric constant and said loss tangent while preserving a substantial fraction of said tunability by providing structures of said ferroelectric material, said structures oriented parallel to a direction of applied dc bias field, said structures also having a critical dimension d in a direction orthogonal to said direction of applied dc bias field and parallel to the direction of propagation of an RF field at a frequency f that is given by the equation $$d \leqq \frac{c}{100f\sqrt{\epsilon_r}}$$

where c is the velocity of light, taken equal to 299,793 kilometers/second;

wherein said method comprises filling spaces defined by a plurality of cells of ferroelectric material with inert dielectric material, said cells having a thickness dimension equal to or less than said critical dimension.

4. The method of claim 3 wherein said cells are rectilinear.

5. The method of claim 3 wherein said cells are hexagonal.

6. A method of altering properties in a ferroelectric material having a dielectric constant $\epsilon_r$, loss tangent δ, and a tunability at a given frequency f, comprising reducing said dielectric constant and said loss tangent while preserving a substantial fraction of said tunability by providing structures of said ferroelectric material, said structures oriented such that at least one dimension of said structures is parallel to a direction of applied dc bias field, said structures having a critical dimension d in a direction orthogonal to said direction of applied dc bias field and parallel to the direction of propagation of an RF field at a frequency f that is given by the equation $$d \leqq \frac{c}{100f\sqrt{\epsilon_r}}$$

where c is the velocity of light, taken equal to 299,793 kilometers/second;

wherein said method comprises embedding a plurality of filaments of ferroelectric material in a matrix of an inert dielectric material, said filaments having a thickness dimension equal to or less than said critical dimension.

7. A method of altering properties in a ferroelectric material having a dielectric constant $\epsilon_r$, loss tangent tan δ, and a tunability at a given frequency f, comprising reducing said dielectric constant and said loss tangent while preserving a substantial fraction of said tunability by providing structures of said ferroelectric material, said structures oriented such that at least one dimension of said structures is parallel to a direction of applied dc bias field, said structures having a critical dimension d in a direction orthogonal to said direction of applied dc bias field and parallel to the direction of propagation of an RF field at a frequency f that is given by the equation $$d \leqq \frac{c}{100f\sqrt{\epsilon_r}}$$

where c is the velocity of light, taken equal to 299,793 kilometers/second;

wherein said method comprises filling spaces defined by a honeycomb structure formed of ferroelectric material with inert dielectric material, said honeycomb structures with walls having a thickness dimension equal to or less than said critical dimension.

8. The method of claim 7 wherein said honeycomb structure is comprised of square cells.

9. A method of altering properties in a ferroelectric material having a dielectric constant $\epsilon_r$, a loss tangent tan δ, and a tunability at a given frequency f, comprising reducing said dielectric constant and said loss tangent while preserving a substantial fraction of said tunability by providing structures of said ferroelectric material, said structures oriented such that at least one dimension of said structures is parallel to a direction of applied dc bias field, said structures also having a critical dimension d in a direction orthogonal to said direction of applied dc bias field and parallel to the direction of propagation of an RF field at a frequency f that is given by the equation $$d \leqq \frac{c}{100f\sqrt{\epsilon_r}}$$

where c is the velocity of light, taken equal to 299,793 kilometers/second;

wherein said method comprises (i) providing a sheet comprising said inert dielectric material and having a substantially uniform array of through holes, and (ii) filling said through holes with ferroelectric material.

* * * * *